United States Patent
Riccardi et al.

(10) Patent No.: US 11,269,047 B2
(45) Date of Patent: Mar. 8, 2022

(54) THREE DIMENSIONAL OBJECT-LOCALIZATION AND TRACKING USING ULTRASONIC PULSES WITH SYNCHRONIZED INERTIAL POSITION DETERMINATION

(71) Applicant: InvenSense, Inc., San Jose, CA (US)

(72) Inventors: Sebastian Riccardi, Brezins (FR); Richard J. Przbyla, Piedmont, CA (US); David A. Horsley, Berkeley (CA); Mitchell H. Kline, Alameda, CA (US)

( * ) Notice: Subject to any disclaimer, the term of this patent is extended or adjusted under 35 U.S.C. 154(b) by 762 days.

(21) Appl. No.: 16/212,503

(22) Filed: Dec. 6, 2018

(65) Prior Publication Data

US 2019/0187244 A1 Jun. 20, 2019

Related U.S. Application Data

(60) Provisional application No. 62/595,562, filed on Dec. 6, 2017.

(51) Int. Cl.
*G01S 5/30* (2006.01)
*G01S 5/18* (2006.01)
*G01C 21/16* (2006.01)
*G06F 3/0346* (2013.01)
*G01S 5/26* (2006.01)
*G06F 3/01* (2006.01)
(Continued)

(52) U.S. Cl.
CPC .............. *G01S 5/30* (2013.01); *G01C 21/165* (2013.01); *G01P 15/18* (2013.01); *G01S 5/18* (2013.01); *G01S 5/186* (2013.01); *G01S 5/26* (2013.01); *G06F 3/017* (2013.01); *G06F 3/033* (2013.01); *G06F 3/0346* (2013.01)

(58) Field of Classification Search
CPC ... G01S 5/30; G01S 5/186; G01S 5/18; G01S 5/26; G06F 3/017; G06F 3/033; G06F 3/0346; G01P 15/18; G01C 21/165
See application file for complete search history.

(56) References Cited

U.S. PATENT DOCUMENTS

2004/0143176 A1* 7/2004 Foxlin ................... G01S 15/86
                                                                    600/395
2016/0259032 A1* 9/2016 Hehn .................... G01S 5/0289

* cited by examiner

*Primary Examiner* — Isam A Alsomiri
*Assistant Examiner* — Amie M Ndure

(57) ABSTRACT

A tracking method is disclosed. The method may include displaying visual content on a screen. A base station may be stationary with respect to the screen while the visual content is being displayed. In contrast, one or more objects may move with respect to the screen while the visual content is being displayed. The one or more objects may be tracked so that the movement thereof may be used to alter the visual content. Such tracking may involve the base station and the one or more objects sending and/or receiving one or more ultrasonic pulses. The tracked object also determines information using an inertial sensor assembly that receives a synchronization signal coordinated with the one or more ultrasonic pulses. Time-difference-of-arrival and/or time-of-flight of the one or more ultrasonic pulses may then be used to estimate a relative location and/or a relative orientation of the one or more objects with respect to the base station in three dimensional space, so that the estimate is fused with information determined by the inertial sensor assembly using the synchronization signal.

23 Claims, 8 Drawing Sheets

(51) Int. Cl.
*G06F 3/033* (2013.01)
*G01P 15/18* (2013.01)

$$T_d > \frac{D}{C} + T_p$$

THREE DIMENSIONAL OBJECT-LOCALIZATION AND TRACKING USING ULTRASONIC PULSES WITH SYNCHRONIZED INERTIAL POSITION DETERMINATION

CROSS-REFERENCE TO RELATED APPLICATIONS

This application claims priority from and benefit of U.S. Provisional Patent Application Ser. No. 62/595,562, filed Dec. 6, 2017, which is entitled "System for determining position and orientation of a mobile device in 6 degrees of freedom," which is assigned to the assignee hereof and is incorporated by reference in its entirety. This application is also a continuation-in-part of U.S. patent application Ser. No. 15/360,673, filed Nov. 23, 2016, which is entitled "THREE DIMENSIONAL OBJECT-LOCALIZATION AND TRACKING USING ULTRASONIC PULSES," which is also incorporated by reference in its entirety.

STATEMENT REGARDING FEDERALLY SPONSORED RESEARCH OR DEVELOPMENT

This invention was made with Government support under IIP-1456376 awarded by the National Science Foundation. The Government has certain rights in this invention. See 45 C.F.R. 650.4(f)(4).

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. 1.14.

FIELD OF THE PRESENT DISCLOSURE

This invention relates to localization and tracking and more particularly to systems and methods for estimating relative location and/or relative orientation based on ultrasonic time-of-flight and/or time-difference-of-arrival measurements.

BACKGROUND

The development of microelectromechanical systems (MEMS) has enabled the incorporation of a wide variety of sensors into mobile devices, such as cell phones, laptops, tablets, gaming devices and other portable, electronic devices. Non-limiting examples of such sensors include an accelerometer, a gyroscope, a magnetometer, a pressure sensor, a microphone, a proximity sensor, an ambient light sensor, an infrared sensor, and the like. Further, sensor fusion processing may be performed to combine the data from a plurality of sensors to provide an improved characterization of the device's motion or orientation.

Numerous applications may benefit from the use of such sensors to determine the position and/or motion of a portable device. As one non-limiting example, Augmented Reality (AR) systems and Virtual reality (VR) systems often have a Head Mounted Display (HMD) for which it would be desirable to provide user input via a portable device, such as a controller that is either worn or held in a user's hand. Correspondingly, the HMD may employ position information about the controller and/or information characterizing the motion of the controller for a wide range of user inputs, including recognition of predetermined gestures or creating a correspondence between the physical controller and a virtual object, such as a cursor or pointer. To provide that information, a controller sometimes will include an inertial measurement unit (IMU).

Although MEMS technologies have allowed the widespread use of the types of sensors discussed above and may be used to implement the IMU, one disadvantage associated with using these relatively low cost devices is performance degradation due to accumulated sensor drifts and bias. Further, IMUs often cannot alone provide the granularity of information that is needed or desired. Accordingly, what are needed are improved systems and methods for tracking controllers.

SUMMARY

As will be described in detail below, this disclosure includes a method that involves moving at least one tracked object with respect to a base station, the at least one tracked object comprising at least one ultrasonic transducer and at least one inertial sensor assembly, the base station comprising first, second, and third ultrasonic transducers; and tracking, during the moving, relative distance in three dimensional space between the base station and the at least one tracked object, the tracking comprising transmitting, by the first ultrasonic transducer, a first ultrasonic pulse, transmitting, by the second ultrasonic transducer, a second ultrasonic pulse, wherein a time delay between the first ultrasonic pulse and the second ultrasonic pulse is greater than a pulse duration of the first ultrasonic pulse plus a distance between the first and second transducers divided by a speed of sound in an environment surrounding the base station, transmitting, by the third ultrasonic transducer, a third ultrasonic pulse, wherein a time delay between the second ultrasonic pulse and the third ultrasonic pulse is greater than a pulse duration of the second ultrasonic pulse plus a distance between the second and third transducers divided by the speed of sound, receiving, by the at least one ultrasonic transducer, the first, second, and third ultrasonic pulses, using at least one of time-difference-of-arrival and time-of-flight of the first, second, and third ultrasonic pulses to estimate at least one of a relative location and a relative orientation of the at least one tracked object with respect to the base station in three dimensional space, receiving with the inertial sensor assembly a synchronization signal coordinated with the at least one ultrasonic transducer and fusing the estimate with information derived from the inertial sensor assembly based at least in part on the synchronization signal.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
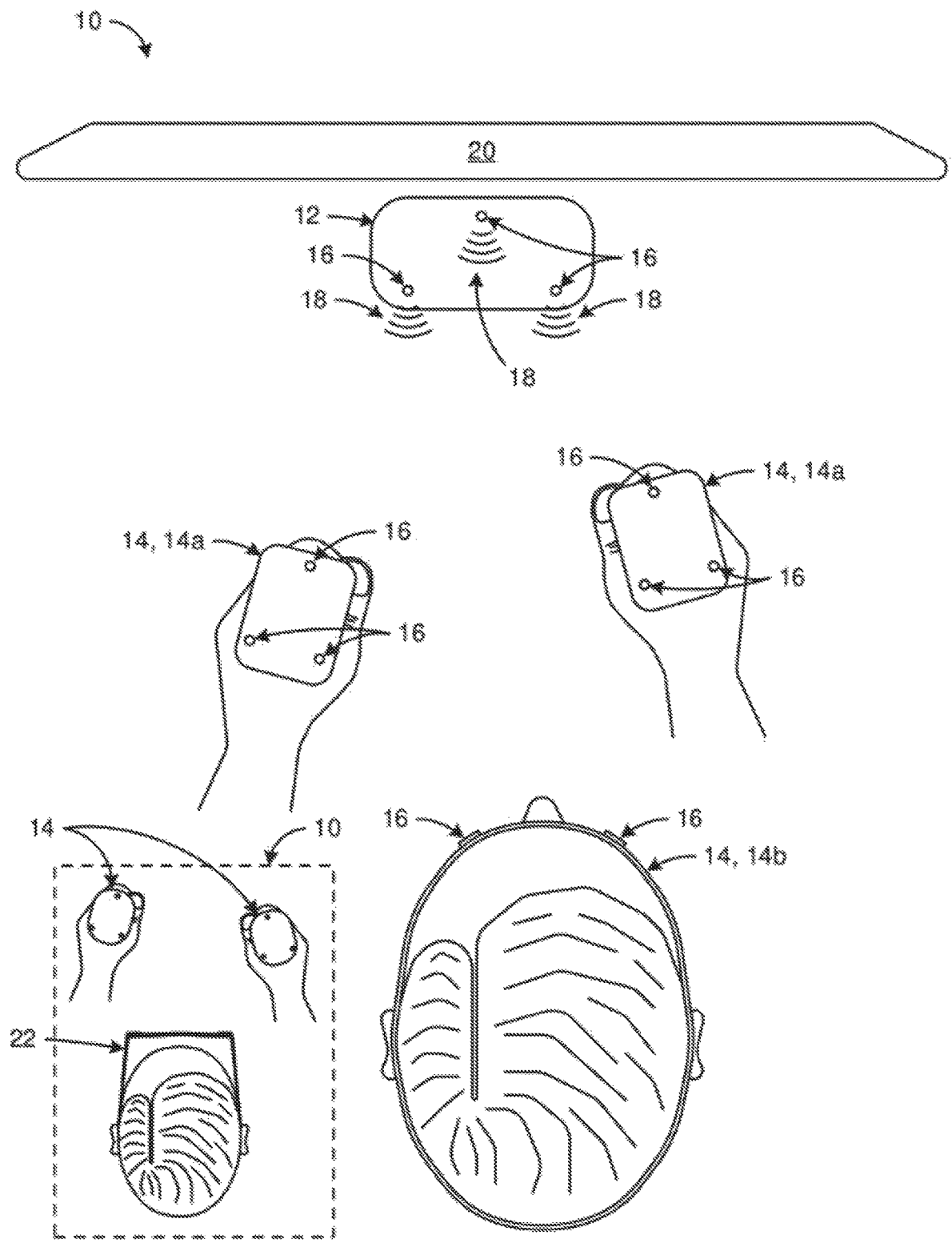
FIG. 1 is a schematic diagram illustrating a top view of one embodiment of a system in accordance with the present invention as the system is being used by a human user.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a Motion Processor Unit (MPU) or Sensor Processing Unit (SPU) and a microprocessor, a plurality of microprocessors, one or more microprocessors in conjunction with an MPU/SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The invention has been developed in response to the present state of the art and, in particular, in response to the problems and needs in the art that have not yet been fully solved by currently available apparatus and methods. Accordingly, the invention has been developed to provide apparatus and methods for localization and tracking of objects and, more particularly, using periodic ultrasonic pulses to determine location and/or orientation between one or more components in three dimensional space.

Referring to FIG. 1, a system 10 in accordance with the present invention may include a base station 12 and one or more tracked objects 14 whose relative location and/or orientation with respect to the base station 12 may be tracked. Tracked objects 14 may be free to move with respect to one another and with respect to a base station 12. For example, one or more tracked objects 14 may be manipulated (e.g., translated, rotated, or some combination thereof) in three dimensional space by one or more human users of a system 10. In certain embodiments, a base station 12 may also be manipulated (e.g., translated, rotated, or some combination thereof) in three dimensional space by one or more human users of a system 10.

In selected embodiments, each of the base station 12 and one or more tracked objects 14 may include one or more ultrasonic transducers 16 that selectively transmit and/or receive one or more ultrasonic pulses 18. The locations of all the transducers 16 on a base station 12 and the locations of all the transducers 16 on one or more tracked objects 16 may be known based on the mechanical design of the base station 12 and one or more tracked objects 14, respectively. Accordingly, information corresponding to the one or more ultrasonic pulses 18 (e.g., time-difference-of-arrival, time-of-flight, or the like) may be used to estimate the relative locations and/or orientations of the base station 12 and one or more tracked objects 14 with respect to one another.

In selected embodiments, the relative locations and/or orientations of a base station 12 and one or more tracked objects 14 may be described in terms of predetermined or pre-identified reference points. For example, the location and/or orientation of a tracked object 14 or base station 12 may be described or communicated in terms of a centroid or center of mass thereof. Alternatively, the predetermined or pre-identified reference point of a tracked object 14 and/or base station 12 may be an IMU that forms part of the same.

In certain embodiments, a system 10 may enable one or more human users thereof to interact with or participate in a virtual reality (VR) environment, mediated reality (MR) environment, augmented reality (AR) environment, remote surgery (also known as telesurgery), or the like. Accordingly, in certain embodiments, a system 10 may include one or more screens 20.

A screen 20 may display visual content. Movements imposed by one or more users on a base station 12, one or more tracked objects 14, or some combination thereof may be detected and used in some manner to affect, change, or interact with the visual content displayed on a screen 20. For example, in certain embodiments, at least a portion of that visual content displayed on a screen 20 may be virtual. Accordingly, movements imposed by one or more users on a base station 12, one or more tracked objects 14, or some combination thereof may be tracked and used to alter, control, or the like the virtual content.

In certain "tethered" embodiments, a system 10 may be or form part of a VR, MR, AR, and/or telesurgery system or the like wherein certain operations (e.g., the computation necessary for tracking) are performed on a personal computer (PC) or gaming console that is connected to an head-mounted display (HMD) 22. In such embodiments, a base station 12 may be included as part of the HMD 22 or may rest stationary with respect to, connect directly to, and/or form part of or an extension to the PC or gaming console. Accordingly, in selected embodiments, an HMD 22 may be a tracked object 14 that includes one or more screens 20.

In certain "untethered" embodiments, a system 10 in accordance with the present invention may be or form part of a VR, MR, AR, and/or telesurgery system or the like wherein controller tracking (e.g., tracking of one or more tracked objects 14 such as one or more hand-held controllers) and head tracking are performed on an HMD 22 that includes a base station 12 and one or more screens 20.

Accordingly, in selected embodiments, while a system 10 is operating or in use, a base station 12 may be maintained or left in a stationary relationship with respect to the earth and/or with respect to one or more screens 20. For example, in selected embodiments, a base station 12 of a system 10 may sit (e.g., rest in a stationary manner) on a desk, table, or other supporting surface. One or more screens 20 of the system 10 may also sit (e.g., rest in a stationary manner) on a desk, table, or other supporting surface. Accordingly, the base station 12 and one or more screens 20 may be stationary with respect to the earth and with respect to one another.

Alternatively, a base station 12 may be moved by a user while a system 10 is operating or in use. For example, in certain embodiments, a base station 12 and one or more screens 20 may be incorporated within or form part of a head-mounted display (HMD) 22. Accordingly, the base station 12 and one or more screens 20 may be stationary with respect each other, yet move with respect to the earth as dictated by a human user.

Tracked objects 14 in accordance with the present invention may have any suitable form. For example, a tracked object 14 may be a hand-held controller 14a or wand 14a, ring, wrist band, glove (e.g., a glove with one or more ultrasonic transducers 16 on each finger to enable the location and/or orientation of each finger or finger joint to be tracked). Alternatively, or in addition thereto, one or more tracked objects 14 may correspond to something other than a user's hands. For example, one or more tracked objects 14 may be mounted to or worn on other body parts such as arms, legs, feet, and/or head. For example, a tracked object 14 may be a head-worn device such as a hat, visor, head band 14b, pair of glasses or goggles, face mask, or the like or a combination or sub-combination thereof.

Figure 2:
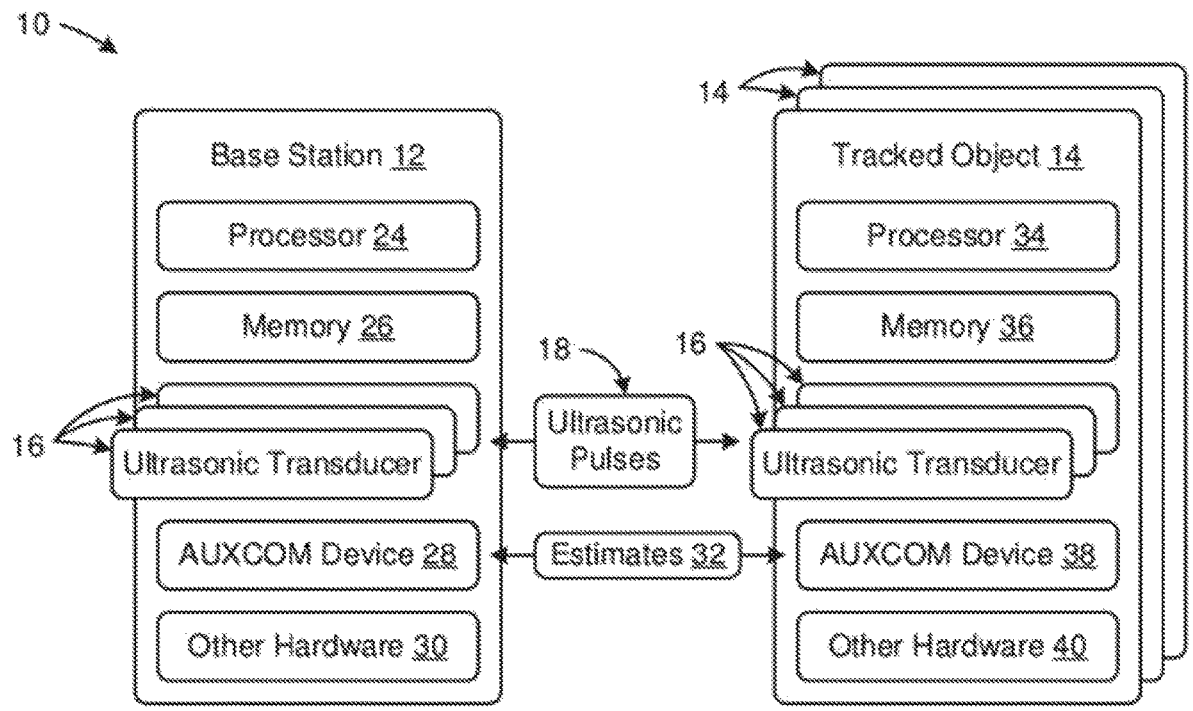
FIG. 2 is a schematic block diagram illustrating one embodiment of the internal makeup of various components of a system in accordance with the present invention.

Referring to FIG. 2, a base station 12 in accordance with the present invention may transmit one or more ultrasonic pulses 18, receive one or more ultrasonic pulses 18, use one or more time-difference-of-arrival and/or time-of-flight measurements to estimate its relative location and/or orientation with respect to one or more tracked objects 14, receive estimates 32 of the relative location and/or orientation of one or more tracked objects 14 with respect thereto, or the like or a combination or sub-combination thereof. A base station 12 may accomplish this in any suitable manner. For example, a base station 12 may be embodied as hardware, software, or some combination thereof.

In selected embodiments, a base station 12 may include computer hardware, other electrical hardware, and computer software. For example, the hardware of a base station 12 may include one or more processors 24, memory 26, one or more ultrasonic transducers 16, one or more auxiliary communications devices 28, other hardware 30 as desired or necessary, or the like or a combination or sub-combination thereof.

The memory 26 of a base station 12 in accordance with the present invention may be operably connected to one or more processors 24 and store data, computer software, or some combination thereof. This may enable one or more processors 24 to execute the computer software, operate on the data, or the like. Accordingly, one or more processors 24 may control one or more operations (e.g., all operations) of a base station 12 by running computer software stored in memory 26.

Each of the ultrasonic transducers 16 of a base station 12 may convert electrical signal into corresponding ultrasonic waves and/or convert ultrasonic waves into corresponding electrical signal. Moreover, each of the ultrasonic transducers 16 of a base station 12 may be embodied within a different ultrasonic receiver, ultrasonic transmitter, or ultrasonic transceiver. Accordingly, operating in conjunction with other supporting hardware 30 and/or software systems stored in memory 26 (e.g., hardware and/or software modulators, demodulators, or the like), each ultrasonic transducer 16 of a base station 12 may be an independent source or recipient of one or more ultrasonic transmissions. In selected embodiments, a base station 12 may include three or more ultrasonic transducers 16, each embodied within or forming part of a different ultrasonic transceiver.

A base station 12 may communicate with (i.e., send information to and/or receive information from) one or more tracked objects 14. For example, in selected embodiments, each tracked object 14 may use one or more ultrasonic pulses 18 transmitted by a base station 12 to estimate its location and/or orientation with respect to the base station 12. Accordingly, communication between the base station 12 and the one or more tracked objects 14 may enable the base station 12 to receive the location and/or orientation estimates 32 generated by the one or more tracked objects 14.

A base station 12 may communicate with one or more tracked objects 14 in any suitable manner. In selected embodiments, a base station 12 may communicate with one or more tracked objects 14 by encoding and/or decoding information within one or more ultrasonic transmissions. Alternatively, a base station 12 and one or more tracked objects 14 may use ultrasonic transmissions for localization and tracking and may use an auxiliary communication path (e.g., wireless radio transmission, wired serial communication, or the like) to communicate (e.g., receive estimates 32). In such embodiments, an auxiliary communication device 28 may provide, enable, or support the auxiliary communication path. In selected embodiments, an auxiliary communication device 28 of a base station 12 may comprise a radio transceiver configured to transmit and/or receive encoded UHF radio waves (e.g., radio communication compliant with a BLUETOOTH standard or the like).

A tracked object 14 in accordance with the present invention may transmit one or more ultrasonic pulses 18, receive one or more ultrasonic pulses 18, use one or more time-difference-of-arrival and/or time-of-flight measurements to estimate its relative location and/or orientation with respect to a corresponding base station 12, transmit estimates 32 of its relative location and/or orientation to a corresponding base station 12 or the like or a combination or sub-combination thereof. A tracked object 14 may accomplish this in any suitable manner. For example, a tracked object 14 may be embodied as hardware, software, or some combination thereof.

In selected embodiments, a tracked object 14 may include computer hardware, other electrical hardware, and computer software. For example, the hardware of a tracked object 14 may include one or more processors 34 (e.g., microprocessors), memory 36, one or more ultrasonic transducers 16, one or more auxiliary communications devices 38, other hardware 40 as desired or necessary, or the like or a combination or sub-combination thereof.

The memory 36 of a tracked object 14 in accordance with the present invention may be operably connected to one or more processors 34 and store data, computer software, or some combination thereof. This may enable one or more processors 34 to execute the computer software, operate on the data, or the like. Accordingly, one or more processors 34 may control one or more operations (e.g., all operations) of a tracked object 14 by running computer software stored in memory 36.

Each of the ultrasonic transducers 16 of a tracked object 14 may convert electrical signal into corresponding ultrasonic waves and/or convert ultrasonic waves into corresponding electrical signal. Moreover, each of the ultrasonic transducers 16 of a tracked object 14 may be embodied within a different ultrasonic receiver, ultrasonic transmitter, or ultrasonic transceiver. Accordingly, operating in conjunction with other supporting hardware 40 and/or software systems stored in memory 36 (e.g., hardware and/or software based modulators, demodulators, or the like), each ultrasonic transducer 16 of a tracked object 14 may be an independent source or recipient of one or more ultrasonic transmissions.

In selected embodiments, one or more tracked objects 14 within a system 10 may each include three transducers 16, each embodied within or forming part of a different ultrasonic transceiver. This may enable three vectors (e.g., in Cartesian coordinates (x1,y1,z1), (x2,y2,z2), (x3,y3,z3)) respectively representing the coordinates of the three transducers 16 with respect to a base station 12 to be calculated using time-difference-of-arrival and/or time-of-flight measurements collected for one or more ultrasonic pulses 18. Accordingly, when a tracked object 14 has more than one transducer 16, the respective coordinate vectors of the transducers 16 may be used, along with the known locations of the transducers 16 on the tracked object 14, to determine both the location and orientation of the tracked object 14 relative to a corresponding base station 12.

A tracked object 14 may communicate with (i.e., send information to and/or receive information from) a base station 12. For example, in selected embodiments, a tracked object 14 may transmit to a corresponding base station 12 the location and/or orientation estimates 32 prepared by the tracked object 14. In selected embodiments, a tracked object 14 may communicate with a base station 12 by encoding and/or decoding information within one or more ultrasonic transmissions. Alternatively, an auxiliary communication device 38 may provide, enable, or support an auxiliary communication path between a tracked object 14 and a base station 12. In selected embodiments, an auxiliary communication device 30 of a target object 14 may comprise a radio transceiver configured to transmit and/or receive encoded UHF radio waves (e.g., radio communication compliant with a BLUETOOTH standard or the like).

In selected embodiments, time-of-flight measurements may be used to estimate a relative three dimensional location and/or orientation of one or more tracked objects 14 with respect to a base station 12. For example, in one or more measurement cycles, an ultrasonic pulse 18 may be transmitted by a transducer 16 on a tracked object 14 and received by three or more transducers 16 on a base station 12. From the three or more time-of-flight measurements, the known speed of sound in the environment surrounding the system 10, and the known location of the three or more transducers 16 on the base-station 12, the hardware and/or software of the base station 12 may use a trilateration algorithm to find the coordinates of the transmitting transducer 16 relative to the base station 12.

In other embodiments, the process may be reversed. That is, in one or more measurement cycles, three or more transducers 16 on a base station 12 may transmit an ultrasonic pulse 18 to a tracked object 14. Using the three or more time-of-flight measurements, the known speed of sound in the environment surrounding the system 10, and the known locations of the three or more transducers 16 on the base station 12, each transducer 16 on the tracked object 14 may use a trilateration algorithm to find its coordinates relative to the base station 12.

When using ultrasonic pulses 18 to estimate relative location and/or orientation, it may be desirable or necessary to have a mechanism for distinguishing the ultrasonic pluses 18 emanating from one transducer 16 from the ultrasonic pulses 18 emanating from another. Accordingly, in certain embodiments, each transmitting transducer 16 on a base station 12 and/or tracked object 14 may transmit ultrasonic pulses 18 encoded with identifying information.

That is, each ultrasonic pulse 18 may be encoded with a distinct identification code that allows any recipient thereof within a system 10 to identify the transducer 16 that generated the ultrasonic pulse 18. Various encoding schemes may be used to encode such identifications. In certain embodiments, information identifying sources of one or more ultrasonic pulses 18 may be encoded using phase-shift keying (PSK) such as quadrature phase-shift keying (QPSK) or differential phase-shift keying (DPSK).

Figure 3:
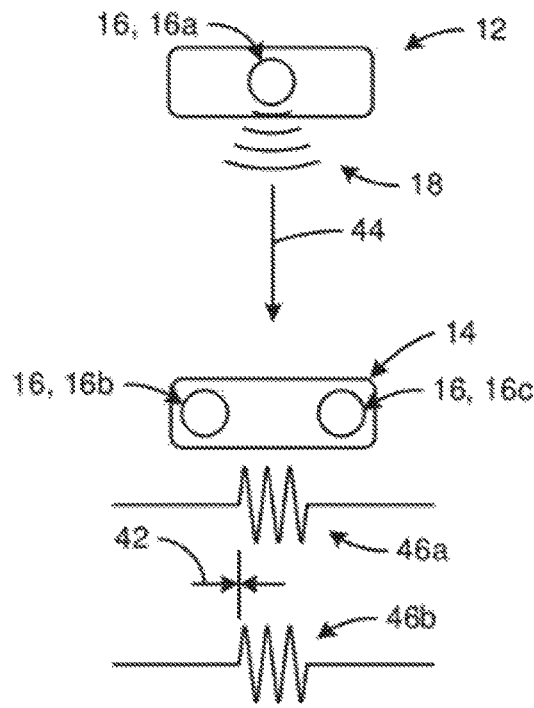
FIG. 3 is a schematic diagram illustrating a moment in time when a tracked object has a normal or directly "face-on" orientation with respect to a base station.
Figure 4:
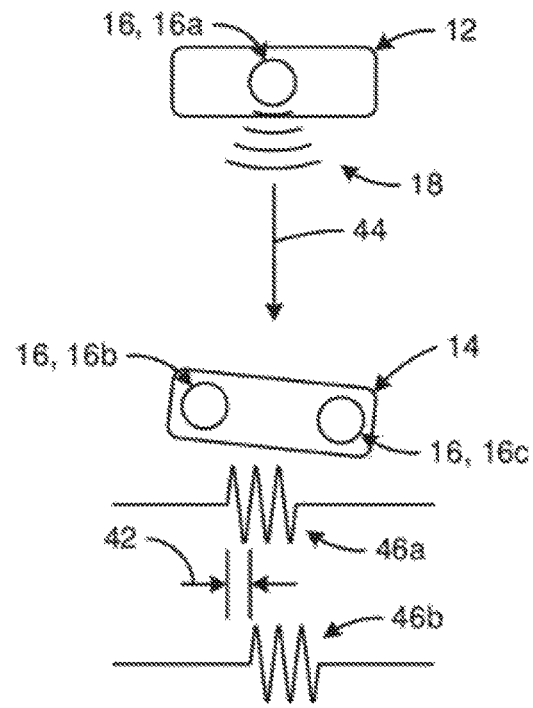
FIG. 4 is a schematic diagram illustrating a moment in time when a tracked object has deviated somewhat from a normal or directly "face-on" orientation with respect to a base station.

Referring to FIGS. 3 and 4, in selected embodiments, the three dimensional location and/or orientation of one or more tracked objects 14 relative to one or more transducers 16 of a base station 12 may be determined based on a time-difference-of-arrival 42 of an ultrasonic pulse 18. A two-dimensional example of this is illustrated. For this illustrative example, a first transducer 16a is located on a base station 12. Second and third transducers 16b, 16c are located on a tracked object 14. At the moment in time illustrated in FIG. 3, the tracked object 14 has a normal orientation relative to a propagation axis 44 of an ultrasonic pulse 18. Moreover, in this normal orientation, the two transducers 16b, 16c of the tracked object 14 are equidistant from the transducer 16a on the base station 12. As a result, the ultrasonic pulse 18 will reach the second and third transducers 16b, 16c at the same time.

Accordingly, the hardware and/or software of the tracked object 14 may compare the time-of-arrival of the ultrasonic pulse 18 in the output 46a of the second transducer 16b to the time-of-arrival of the ultrasonic pulse 18 in the output 46b of the third transducer 16c. For the moment in time illustrated in FIG. 3, the difference of these two times (i.e., the time-difference-of-arrival 42) is zero. Accordingly, the tracked object 14 may know that the second and third transducers 16b, 16c are equidistant from the first transducer 16c. Knowing this, the tracked object 14 may further know that at this particular moment in time, it has a normal orientation relative to the propagation axis 44 of the ultrasonic pulse 18.

At the moment in time illustrated in FIG. 4, the tracked object 14 has rotated slightly away from a normal orientation relative to a propagation axis 44 of an ultrasonic pulse 18. As a result, the ultrasonic pulse 18 will reach the second transducer 16b before it reaches the third transducer 16c.

Accordingly, the hardware and/or software of the tracked object 14 may compare the time-of-arrival of the ultrasonic pulse 18 in the output 46a of the second transducer 16b to the time-of-arrival of the ultrasonic pulse 18 in the output 46b of the third transducer 16c. For the moment in time illustrated in FIG. 4, the difference of these two times (i.e., the time-difference-of-arrival 42) may be some non-negligible value. Accordingly, knowing the time-difference-of-arrival 42, the distance between the second and third transducers 16b, 16c, and the speed of sound in the environment surrounding the tracked object 14, the hardware and/or software of the tracked object 14 may estimate how far it has deviated from a normal orientation relative to the propagation axis 44 of the ultrasonic pulse 18.

While this illustrative example deals with only two dimensions, the concepts explained above may be easily expanded to three dimensions. Specifically, three non-collinear transducers 16 on a tracked object 14 may allow the three orientation angles (e.g., θx,θy,θz) of the tracked object 14 to be determined. Additionally, with three non-collinear transducers 16 on a tracked object 14 and three non-collinear transducers 16 on a base station 12, time-difference-of-arrival may be used to estimate the relative orientation of both components 12, 14.

In comparison to time-of-flight measurements, time-difference-of-arrival 42 measurements do not require knowledge of when the ultrasonic pulse 18 at issue was transmitted by a base station 12. Only a local timing reference on the tracked object 14 may be needed. In addition, while the minimum time-of-flight measurement period may be limited by the propagation time of an ultrasonic pulse 18 from base station 12 to tracked object 14 (which is approximately 3 milliseconds for a separation of about 1 meter), the time difference-of-arrival can be measured at a high update rate. Typically, the maximum update rate may depend only on the time duration of the transmitted ultrasonic pulse 18. Accordingly, in an embodiment employing ultrasonic transducers 16 with 5 kHz bandwidth, the time-difference-of-arrival 42 may be measured 5000 times per second, providing orientation estimates for the tracked object 14 at a high update rate.

Figures 5, 6:
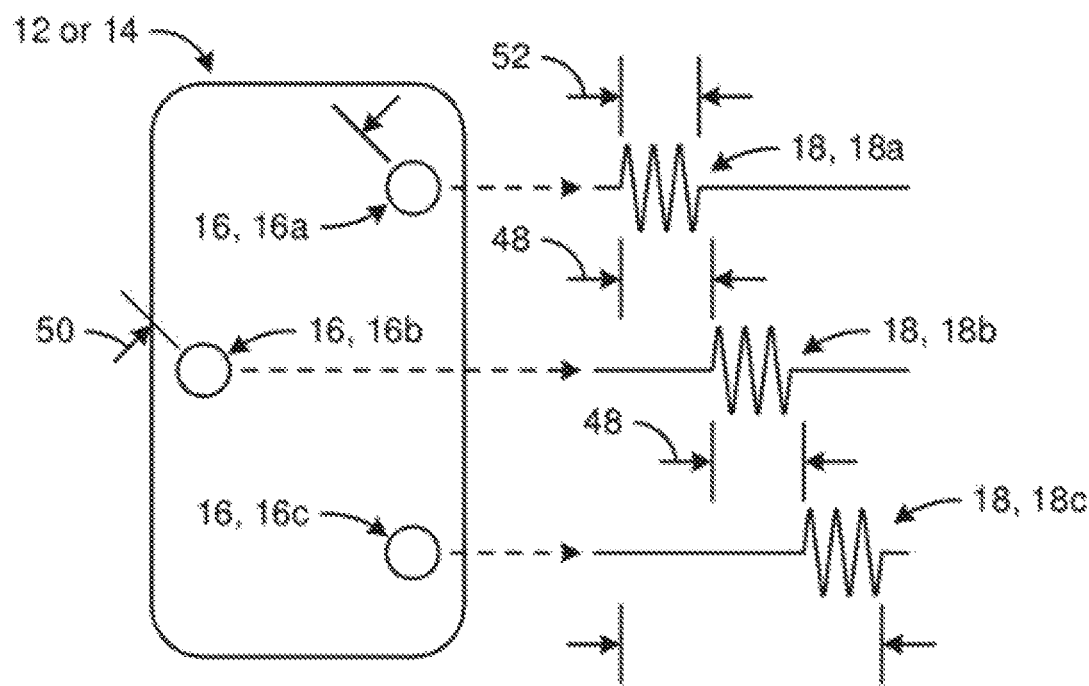
FIG. 5 is a schematic diagram illustrating a base station or tracked object emitting three ultrasonic pulses in series with a time delay between each ultrasonic pulse.
FIG. 6 is an illustration of one mathematical formula that may be used to calculate a time delay between ultrasonic pluses that are transmitted in series.

Referring to FIGS. 5 and 6, a system 10 in accordance with the present invention may employ a timing scheme to enable ultrasonic pulses 18 to be transmitted in sequence from a tracked object 14 to the base station 12 or vice versa without interfering with one another. For example, in a first measurement cycle, three non-collinear transducers 16a, 16b, 16c on a base station 12 or tracked object 14 may be triggered to send first, second, and third ultrasonic pulses 18a, 18b, 18c in sequence. Each ultrasonic pulse 18a, 18b, 18c may be delayed with respect to an immediately preceding ultrasonic pulse 18 by a time-delay 48 that is selected to ensure that the ultrasonic pulses 18a, 18b, 18c are separated (i.e., do not overlap) in their time of arrival at a receiving transducer 16.

For first and second transducers 16a, 16b separated by a particular distance 50, the time-delay 48 between ultrasonic pulses 18 having a particular duration 52 and traveling at a particular speed 54 (i.e., the speed of sound in the environment surrounding a system 10) may be greater than the particular pulse duration 52 plus the particular distance 50 divided by the particular speed 54. When the time delay 48 meets this requirement, the two pulses 18a, 18b will have distinct (e.g., non-overlapping) times-of-arrival at any receiving transducer 16.

A similarly calculated time delay 48 may ensure that the pulses 18b, 18c of the second and third transducers 16b, 16c will have distinct times-of-arrival at any receiving transducer 16. Moreover, cumulative time delays 48 will ensure that the pulses 18a, 18c of the first and third transducers 16a, 16c will have distinct times-of-arrival at any receiving transducer 16.

Accordingly, by measuring the absolute time-of-flight and/or time-difference-of-arrival of the three pulses 18a, 18b, 18c using a trilateration algorithm, the relative range and/or orientation of base station 12 and corresponding tracked object 14 may be estimated. In selected embodiments, it may be desirable to extend the time delay 48 above the amount calculated above so that reflections (e.g., multi-path ultrasonic pulses) from nearby objects do not create interference between sequential ultrasonic pulses 18.

In selected embodiments, each transducer 16 that is not transmitting may receive in order to hear ultrasonic pulses 18 from neighboring transducers 16 (e.g., transducers 16 located on the same base station 12 or tracked object 14). For example, a first transducer 16a may transmit a first ultrasonic pulse 18a. That pulse 18a may be received by second and/or third transducers 16b, 16c. Accordingly, a time-of-flight estimate between the first transducer 16a and the second and/or third transducers 16b, 16c may be determined. If the distances between the various transducers 16a, 16b, 16c are fixed and known, such time-of-flight estimates may be used to detect and compensate for variations in the speed of sound caused by environmental changes. Alternately, if the distances between the various transducers 16a, 16c, 16b are unknown or vary over time (e.g., the transducers 16a, 16b, 16c are mounted on a flexible substrate or composed of separate tags), such time-of-flight estimates may be used to detect and/or compensate for variations in the spacing between neighboring transducers 16a, 16b, 16c.

Figure 7:
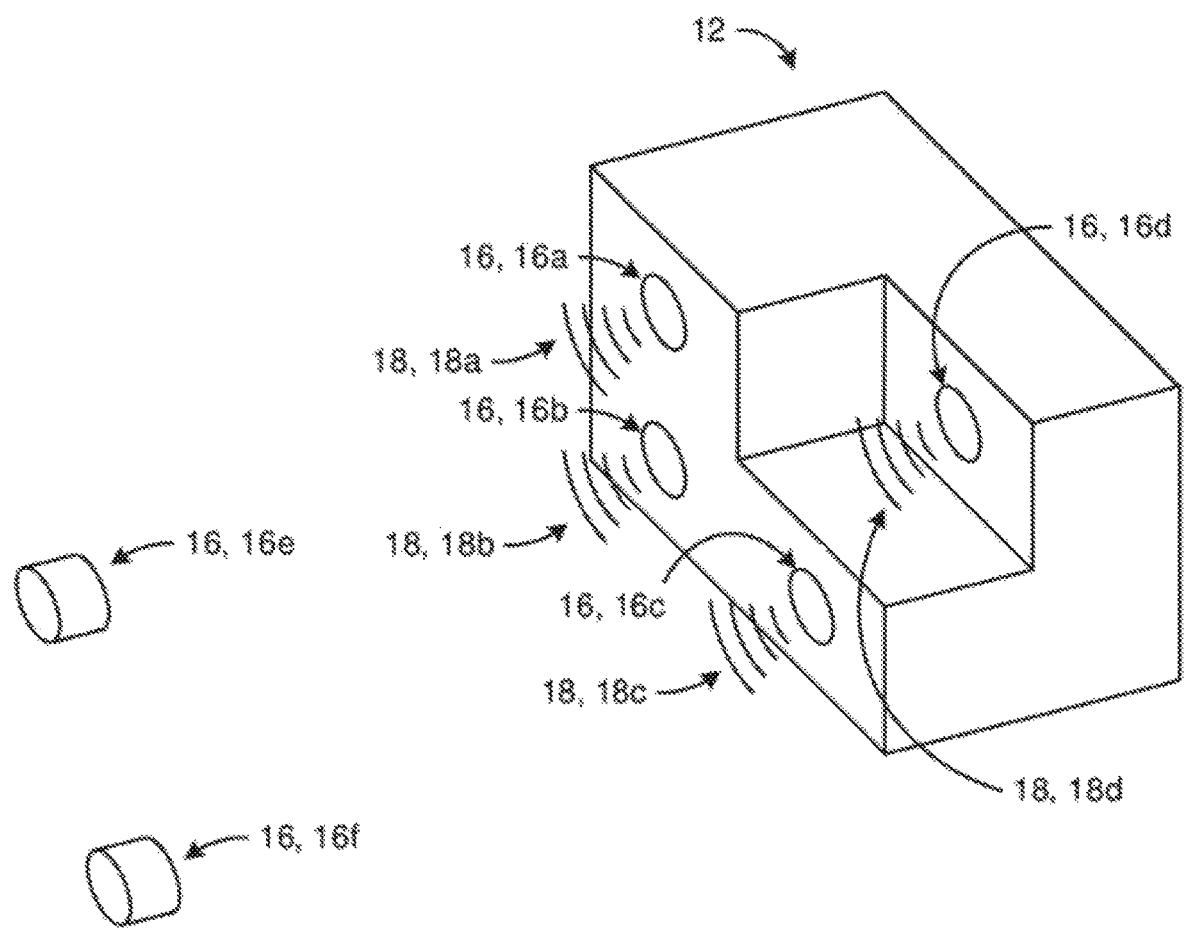
FIG. 7 is a schematic illustration of a one embodiment of a base station comprising more than three ultrasonic transducers.

Referring to FIG. 7, in selected embodiments, a base station 12 may comprise more than three transducers 16 in order to provide, enable, or support trilateration with time recovery. For example, a base station 12 may include or comprise four transducers 16a, 16b, 16c, 16d. Within each measurement cycle, each transducer 16a, 16b, 16c, 16d may generate or output a corresponding ultrasonic pulse 18a, 18b, 18c, 18d. The ultrasonic pulses 18a, 18b, 18c, 18d may be transmitted in series with a time delay 48 that is fixed and known.

The ultrasonic pulses 18a, 18b, 18c, 18d may be received by one or more receiving transducers 16e, 16f. Accordingly, for each receiving transducer 16e, 16f (e.g., one or more transducers 16 forming part of one or more tracked objects 14), its three dimensional location relative to the base station 12 based on the time-difference-of-arrival of the four ultrasonic pulses 18a, 18b, 18c, 18d may be estimated using trilateration with time recovery.

In such an embodiment, the absolute time of the start of the transmit phase on the base station 12 (e.g., the transmit time at which the first ultrasonic pulse 18 of the measurement cycle was initiated) may be unknown. To enable recovery of the relative three dimensional location and the transmit time, at least one 16d of the four transducers 16a, 16b, 16c, 16d may be positioned so at to be non-coplanar with the others 16a, 16b, 16c. Accordingly, the relative three dimensional location of each receiving transducers 16e, 16f (x,y,z) and the start of the transmit phase may be recovered from the four arrival times at each receiving transducers 16e, 16f.

In such an embodiment, a relative location corresponding to each receiving transducer 16e, 16f may be estimated by one or more processors 34 of one or more corresponding tracked objects 14, rather than by one or more processors 24 of the base station 12. The computation may be done using a least squares algorithm or the like, in which an unlimited number of transmitting transducers 16 may be used in order to improve the estimate 32 corresponding to each receiving transducer 16. One advantage of this embodiment is that a single base station 12 may enable an unlimited number of tracked objects 14 to locate themselves. Another advantage is that additional transmitting transducers 16 may be added to a base station 12 to extend the field of view and/or improve the accuracy of the position estimates 32.

As disclosed above, in certain embodiments, only the time-difference-of-arrival of an ultrasonic pulse 18 may be required to determine the location and/or orientation of a tracked object 14 relative to a base station 12. In other embodiments, the time-of-flight of an ultrasonic pulse 18 may be measured and used to calculate location and orientation.

The time-of-flight may be equal to the time-of-arrival (i.e., when the ultrasonic pulse 18 is received at a receiving transducer 16) minus the transmit time (i.e., the time at which the ultrasonic pulse 18 was initiated). Because the transmitting transducer 16 may be (is typically) located on a separate component 12, 14 from the receiving transducer 16, the transmit time may not be known precisely at the object 12, 14 of the receiving transducer 16. Accordingly, in selected embodiments, the transmit time may be obtained by synchronizing a transmitting transducer 16 and a receiving transducer 16 using radio frequency pulses, optical pulses, ultrasonic pulses 18 (e.g., ultrasonic pulses 18 that are not being used to estimate location and/or position), or the like.

For example, at some point in time a base station 12 and one or more tracked objects 14 may not be synchronized. Accordingly, the base station 12 may emit an ultrasonic trigger pulse 18 that travels to the tracked object 14. Meanwhile, the tracked object 14 may have concluded a receiving phase before the ultrasonic trigger pulse 18 arrives. Accordingly, the tracked object 14 may not detect the ultrasonic trigger pulse 18. The base station 12 may wait out a reference delay (e.g., a delay of about 0 to about 100 milliseconds or, more preferably, about 2 milliseconds to about 20 milliseconds) and begin its own receiving phase, during which it may or may not receive a reply from tracked object 14.

In the situation that the tracked object 14 is not synchronized with the base station 12 and does not detect an ultrasonic trigger pulse 18, the tracked object 14 may wait a predetermined period of time after the beginning of one receiving phase before starting a subsequent receiving phase. The predetermined period of time may be chosen such that the tracked target 14 has a reliably different period than the base station 12. For example, if the base station 12 is configured to transmit every 100 milliseconds, the tracked object 14 may be configured to receive every 90 milliseconds. Accordingly, the tracked object 14 will eventually detect a transmission from the base station 12 even with arbitrary initial timing conditions.

Continuing the process, the base station 12 may emit another ultrasonic triggering pulse 18 after the appropriate time has passed since the last ultrasonic triggering pulse 18. In the event that the tracked object 14 hears this second ultrasonic triggering pulse 18, the tracked object 14 may start and wait out a reference delay (e.g., a delay of about 0 to about 100 milliseconds or, more preferably, about 2 milliseconds to about 20 milliseconds) and then generate a reply pulse 18. In this exemplary situation, the base station 12 may receive the reply pulse 18 during its second receive phase.

Accordingly, the time between the start of second receive phase of the base station 12 and the arrival of the reply pulse 18 may be equal to the round trip time-of-flight between base station 12 and the tracked object 14 plus the difference of the reference delay of the tracked object 18 and the reference delay of the base station 12 plus the difference of any timing errors introduced by the tracked object 14 and the base station 12. In selected embodiments, this estimate of the round trip time-of-flight may be used together with the known speed of sound to obtain a first, relatively rough estimate of the range between the tracked object 14 and the base station 12.

After a tracked object 14 sends reply pulse 18, it may wait a variable time delay. In selected embodiments, it may be desirable for ultrasonic pulses 18 to arrive at the center of the receive phases of a tracked object 14 in order to minimize the probability of missed transmissions due to incorrect receive-phase timing. If a tracked object 14 is moving with respect to a base station 12, the arrival time of ultrasonic pulses 18 may be variable. Furthermore, the clocks on a base station 12 and/or tracked object 14 may have frequency errors or drift that contribute to inaccurate timing of the receive phases. For this reason, a delay-locked feedback loop may be used to ensure that a base station 12 and tracked object 14 operate with the same period and to ensure that receive phases of a tracked object 14 coincide with the arrival times of ultrasonic pulses 18 emitted by the base station 12.

In selected embodiment, a fixed delay based on the predetermined period of a base station 12 may be added to an error signal equal to the difference of the time-of-arrival of an ultrasonic pulse 18 and the center of a corresponding receive phase to create a variable time delay such that the subsequent ultrasonic pulses 18 should arrive at the center of a receive phase. This process may be repeated for each receive phase to form a delay-locked feedback loop that acts to lock the center of the receive phase to the arrival time of the ultrasonic pulses 18.

A delay-locked feedback loop may act to measure the error between the predetermined period of a base station 12 and the period of a tracked target 14 and to drive this error to zero. Since the adjustment of the variable time delay may affect all subsequent measurements, the error signal may, in effect, be integrated by the delay-locked feedback loop. This may result in a first-order integrator loop that cancels the error within the delay resolution of the variable time delay.

As in any feedback controller, higher order control loops that contain proportional, integral, or derivative paths may be used. It may be noted that for implementations or situations in which the tracked object 14 is moving, the delay-lock loop parameters (including the duration of the receive phase) may be configured to ensure that the receive signal doesn't drop out due to rapid changes in the path length between the tracked object 14 and the base station 12. In certain embodiments, this may be accomplished by assuming a maximum velocity of the tracked object 14 relative to the base station 12.

In selected embodiments, by measuring the error between the predetermined period of a base station 12 and the period of a tracked target 14 and driving this error to zero, a system 10 may obtain accurate time-of-flight measurements. Thereafter, a system 10 may use such measurements to estimate location and/or orientation of one or more tracked objects 14 relative to a base station 12.

In certain embodiments, ultrasonic pulses 18 used for synchronization purposes (e.g., ultrasonic triggering pulses 18, reply pulses 18, or the like) may be sent with each time-of-flight measurement. In other embodiments, synchronization pulses 18 may be transmitted at a lower rate (e.g., once every ten time-of-fight measurements, once every then thousand time-of-flight measurements, or the like). In such embodiments, an estimate of the transfer time may be maintained using a local oscillator on each side 12, 14 of the exchange.

In certain embodiments, radio waves may be used for synchronization purposes in the place ultrasonic pulses 18. Auxiliary communication devices 28 and 38 may provide this functionality. In such embodiments, radio-wave synchronization may proceed according to the method described above for ultrasonic synchronization, but with the ultrasonic triggering pulse 18 being replaced by a corresponding radio synchronization packet and the propagation time of the radio synchronization packet being considered negligible given the synchronization accuracy required.

Accordingly, in embodiments incorporating radio synchronization, a base station 12 may transmit a radio synchronization packet at regular intervals. Each tracked object 14 may use a local clock to keep time and to enable (e.g., activate, monitor) a radio receiver forming part of the tracked object 14 prior to the time at which the radio synchronization packet is expected to arrive. Each tracked object 14 may record the arrival time of the radio synchronization packet and use this to ensure that the local clock is synchronized to the clock on base station 12 and that the radio receiver is enabled during the times when the base station 12 transmits the radio synchronization packets.

Additionally, the arrival of a radio synchronization packet may be used by a tracked object 14 to subsequently trigger the start of an ultrasonic receiving phase. In such embodiments, a base station 12 may emit a radio synchronization packet followed immediately by an ultrasonic pulse 18. A tracked object 14 may therefore record the one-way ultrasonic time-of-flight between the base station 12 and the tracked object 14, less the radio propagation time, which may be considered negligible.

In selected embodiments, the arrival of a radio synchronization packet may be used to update a local clock on a tracked object 14 to ensure that it is synchronized with a clock on base station 12. The clocks on the base station 12 and the tracked object 14 may then be used to synchronize the start of a transmitting phase on the base station 12 in which an ultrasonic pulse 18 is transmitted from base station 12 and a receiving phase on the tracked object 14 in which the tracked object 14 listens for and receives the ultrasonic pulse 18. In such embodiments, radio synchronization may be performed prior to each ultrasonic transmission or at a different rate according to the requirements of the application, jitter of the radio synchronization, drift of the clocks, or the like.

It certain embodiments, the roles of a base station 12 and one or more tracked objects 14 may be reversed. Accordingly, a base station 12 may receive ultrasonic pulse 18 from one or more tracked objects 14 or a base station 12 and one or more tracked objects 14 may take turns emitting ultrasonic pulses 18. In selected embodiments, a round-robin technique may be used in order to ensure that ranges between all tracked objects 14 and base stations 12 are measured. For instance, two tracked objects 14 may measure the range between them (e.g., by initiating a transmit phase on one tracked object 14 and a receiving phase on a second tracked object 14) after the tracked objects 14 are synchronized to each other (e.g., through a base station 12 or by each being synchronized with a base station 12 and, hence, with each other).

In selected embodiments, a base station 12 may be comprise one or more transducers 16 or groups of transducers 16 on separate sub-assemblies. These sub-assemblies may be synchronized via the radio or ultrasonic methods disclosed above such that the base station 12 may operate as if it were composed of one assembly. Accordingly, in certain embodiments, three or more separate sub-assemblies may be synchronized in order to schedule ultrasonic transmitting or receiving phases such that a tracked object 14 may determine its position according to the ultrasonic pulses 18 transmitted or received from the several sub-assemblies forming part of a base station 12.

In certain embodiments, radio synchronization may be performed at predetermined time windows. That is, in order to receive a radio synchronization packet, a tracked object 14 may need to have its radio receiver enabled during predetermined time slots. In selected embodiments, these time slots may be set up by a base station 12 using radio waves to communicate the timing and/or periodicity of one or more radio synchronization packets.

In selected embodiments, radio-based communication (e.g., encoded radio waves traveling from a radio transmitter or transceiver to a radio receiver or transceiver) may be used to transmit data from a tracked object 14 to a base station 12. Such data may include time-of-flight estimates corresponding to an ultrasonic transceiver, inertial measurements corresponding to an inertial measurement unit, or the like or a combination thereof. One or more tracked objects 14 may use pre-defined time slots to communicate such data to a base station 12. In certain embodiments, one or more tracked object 14 may be assigned a time slot and periodicity by a base station 12 via radio-based communication.

Figure 8:
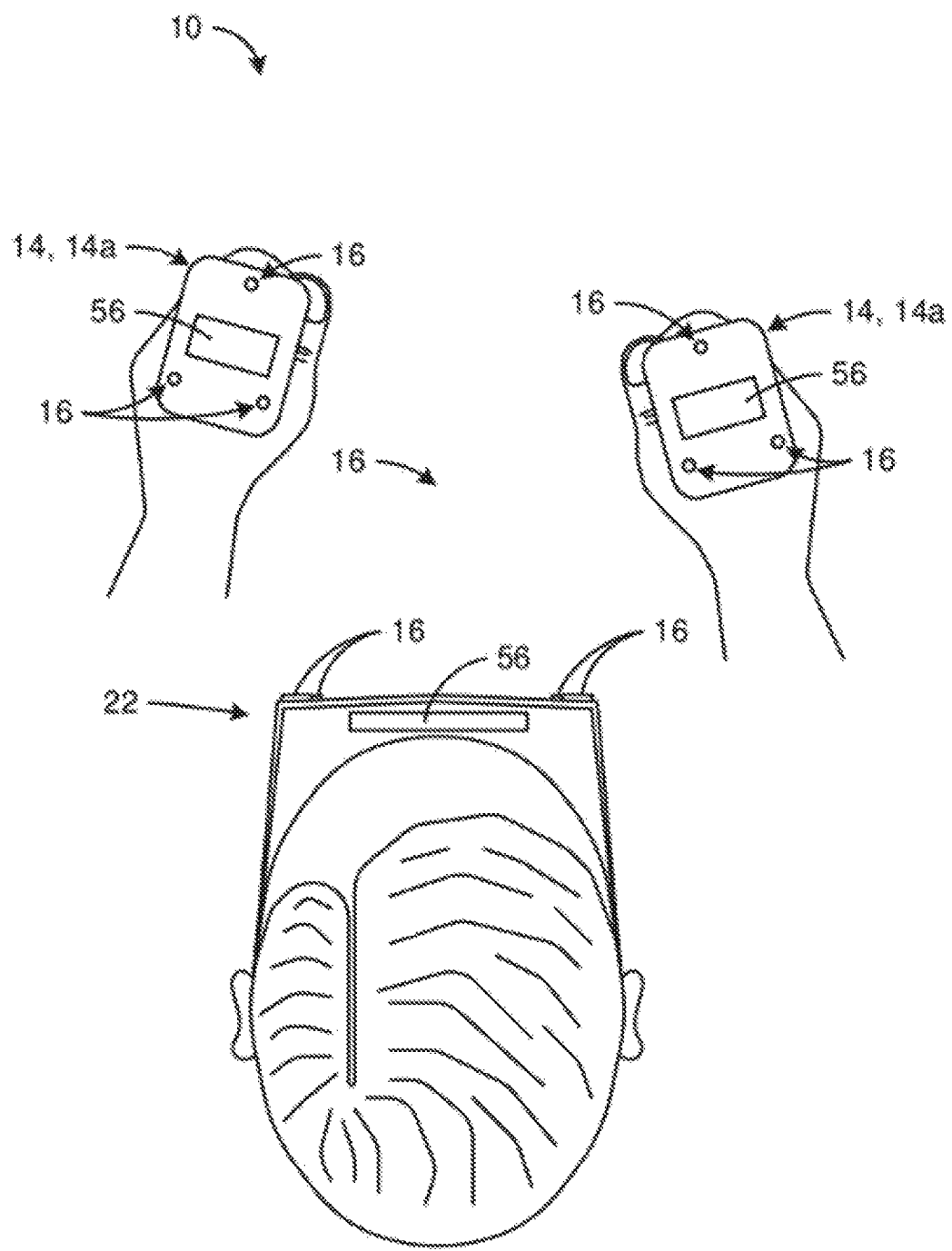
FIG. 8 is a schematic diagram illustrating a top view of an alternative embodiment of a system in accordance with the present invention as the system is being used by a human user.
Figure 9:
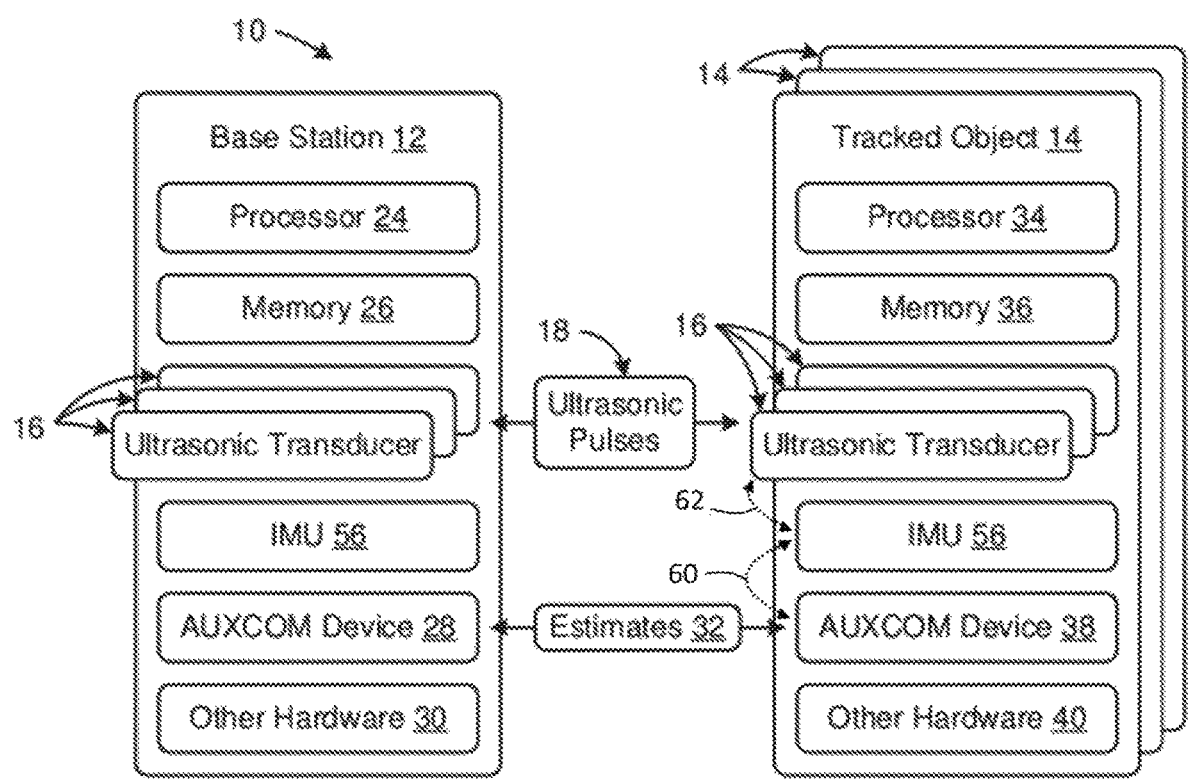
FIG. 9 is a schematic block diagram illustrating an alternative embodiment of the internal makeup of various components of a system in accordance with the present invention.

Referring to FIGS. 8 and 9, in selected embodiments, a base station 12 and/or one or more tracked objects 14 may include an IMU 56. An IMU 56 may be a sensor unit comprising a three-axis gyroscope and a three-axis accelerometer. Accordingly, an IMU 56 may be a six-axis device. In certain embodiments, an IMU 56 may also contain a three-axis magnetic field sensor, in which case it may be a nine-axis device.

In certain embodiments, an IMU 56 may be used to determine a location and/or orientation of a corresponding component 12, 14 in three dimensional space using dead-reckoning. Accordingly, the linear acceleration measured by an IMU 56 in three orthogonal axes $(a_x, a_y, a_z)$ and the rates of angular rotation measured by an IMU 56 in three orthogonal axes $(\omega_x, \omega_y, \omega_z)$ may be numerically integrated to provide a continuous estimate of the three-dimensional location $(x, y, z)$ and orientation angles $(\theta_x, \theta_y, \theta_z)$ of a corresponding component 12, 14.

Because dead-reckoning is based on integration of rates of acceleration and rotation, it may require knowledge of the initial location and/or orientation of a corresponding component 12, 14. In selected embodiments, this initial information about the "state vector" of a component 12, 14 may be provided using measurements derived from one or more ultrasonic pulses 18.

As disclosed above, measurements derived from one or more ultrasonic pulses 18 traveling from a base station 12 to one or more tracked objects 14 or vice versa may be used to estimate both the location (x,y,z) and/or orientation (θx,θy, θz) of the tracked objects 14 relative to the base station 12. Additionally, in selected embodiments, sensor-fusion algorithms (e.g. Kalman filtering, related algorithms, or the like) may be used to fuse the relative location and/or orientation data derived from ultrasonic measurements with the IMU data to provide tracking (e.g., tracking across three to six degrees of freedom) of multiple (e.g., all) components 12, 14 within a system 10 (e.g., tracking of two tracked objects 14 in the form of hand-held controllers and an HMD 22 comprising a base station 12).

In such embodiments, no fixed base station 12 may be needed. Instead of measuring the range of each tracked object 14 relative to a fixed base station 12, sensor fusion may be performed using only relative range measurements (e.g., relative range measurements between an HMD 22 comprising a base station 12 and multiple tracked objects 14 in the form of hand-held controllers). In other words, the location and/or orientation of all components 12, 14 may be computed by fusing: (1) data from the IMU 56 of each component 12, 14; (2) a prior estimated "state" (e.g., location and orientation) of each component 12, 14; and (3) ultrasonically derived estimates 32 of relative position and/or orientation.

Such fusion in accordance with the present invention may remove all or substantially all accumulated error that would otherwise arise with the use of IMUs 56. For example, uncorrected rate bias drift encountered by an IMU 56 of a base station 12 (e.g., an IMU 56 within a base station 12 that forms part of an HMD 22) in the z-axis may cause the estimate for θz to drift over time. However, by using the data (e.g., the inertial data from an IMU 56 and the relative location and/or position data derived from one or more ultrasonic pulses 18) corresponding to one or more tracked objects 14, the angular rate measured by an IMU 56 of the base station 12 (e.g., an IMU 56 forming part of an HMD 22) may be fused with the accelerations measured along the directions normal to the range vectors (x,y,z) between various (e.g., all) IMUs 56 within the system 10.

The rate bias drift that is uncorrelated with accelerations along the normal axes may be rejected by the filtering process. Similarly, the accelerations measured by one IMU 56 (e.g., an IMU 56 of a base station 12) may be augmented by accelerations measured by other IMUs 56 (e.g., IMUs 56 of one or more tracked objects 14) in order to improve the estimate of the absolute location (x,y,z) of the base station 12 (e.g., the absolute location of the HMD 22 comprising the base station 12). Only motions that are correlated on all the various components 12, 14 of a system 10 may be incorporated into the location estimate, which may allow uncorrelated acceleration bias drift to be rejected.

In order to more accurately combine the position information determined by IMU 56 with estimates of location and/or orientation derived from one or more ultrasonic pulses 18 traveling from a base station 12 to one or more tracked objects 14 or vice versa, it may be desirable to correlate the respective timing information. To perform the synchronization, IMU 56 receives a synchronization signal, an "IMU synchronization signal," that is coordinated with the one or more ultrasonic pulses 18. According to the techniques of this disclosure, this may accomplished by using the radio synchronization between auxiliary communication devices 28 and 38 discussed above or by using the transmission of ultrasonic pulses 18. For example, as schematically shown in FIG. 9, auxiliary communication device 38 may be coupled to IMU 56 in tracked object 14 in order to send a synchronization signal 60 based on receipt of the radio synchronization. Alternatively or in addition, ultrasonic transducer 16 may be coupled to IMU 56 in tracked object 14 in order to send a synchronization signal 62 based on transmission of an ultrasonic pulse 18, such as a pulse sent in response to an ultrasonic synchronization pulse. Furthermore, the ultrasonic transducer 16 may be coupled to IMU 56 in tracked object 14 in order to send a synchronization signal at the start of a receiving period of ultrasonic transducer 16. Further, although shown as being implemented in tracked object 14, similar coupling in base station 12 can also be employed in order to synchronize its IMU 56 as desired. Depending on the implementation, positioning based on ultrasonic pulses 18 may be relatively more accurate at making translational position determinations, and this information may be weighted preferentially as desired. Also depending on the implementation, the positioning information derived from IMU 56 may be relatively more accurate at making rotational position determinations, and this information may be weighted preferentially as desired.

Figure 10:
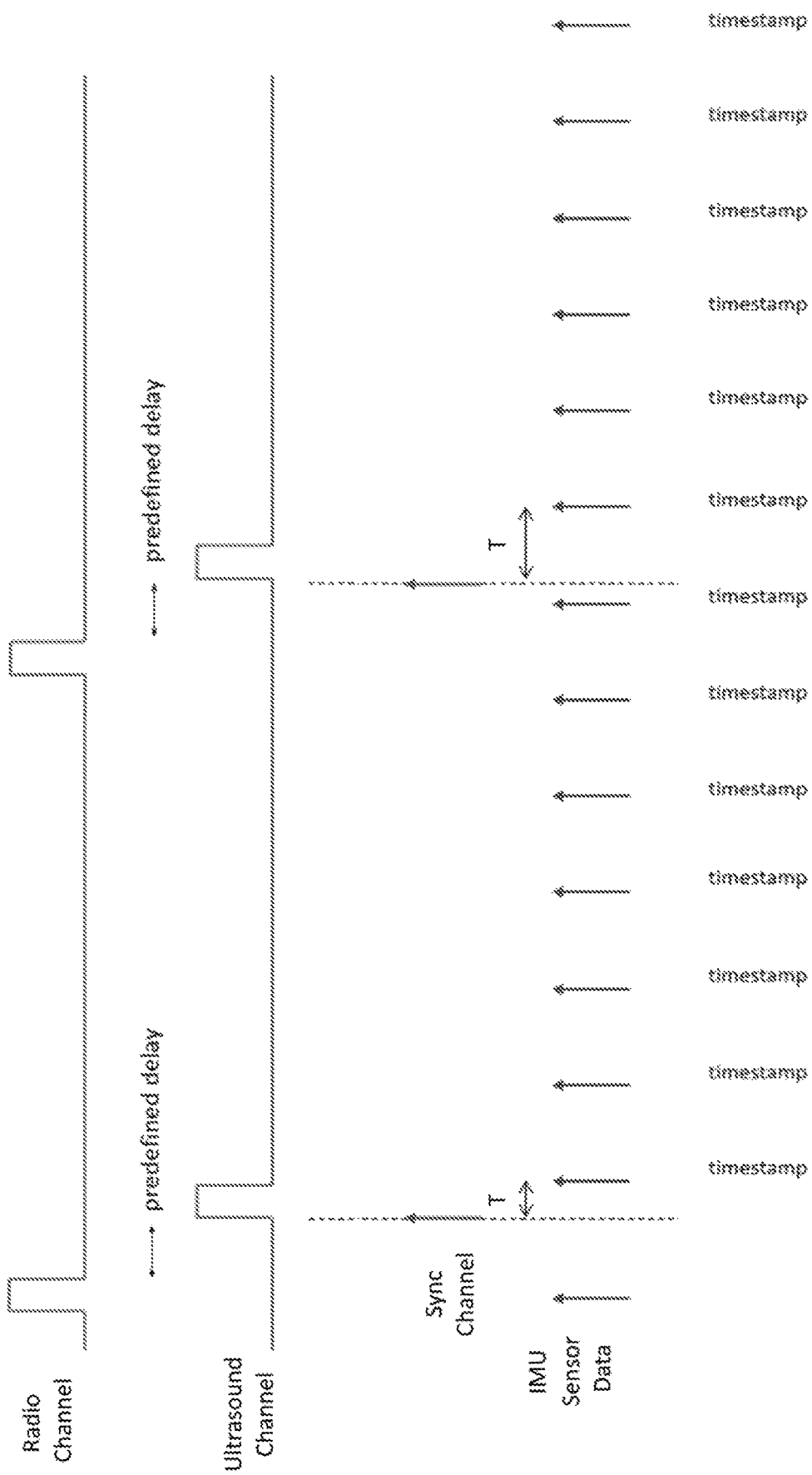
FIG. 10 is a schematic timing diagram showing synchronization of an IMU coordinated with an ultrasonic transducer in accordance with the present invention.

Ultrasonic transducer 16 and IMU 56 may rely on different clocks and any clock drift and/or clock inaccuracy has to be corrected for more accurate fusion of information. Thus, auxiliary communication device 38 may output an IMU synchronization signal to IMU 56. IMU 56 may have a dedicated synchronization input pin as discussed below to receive the IMU synchronization signal. The IMU synchronization signal may be output with a delay with respect to the received radio synchronization packet. The predefined delay is configured to align the synchronization signal with the ultrasonic pulse 18 sent by base station 12. In some embodiments, the delay may be a predefined delay. In one embodiment, the radio synchronization signal may be used as an IMU synchronization signal. In another embodiment, where the arrival of a radio synchronization packet is used to trigger the start of an ultrasonic receiving phase as discussed above, the ultrasonic trigger signal may be used as the IMU synchronization signal. In yet another embodiment, the received ultrasonic signal may be used as the IMU synchronization signal. In turn, when IMU 56 received the IMU synchronization signal, IMU 56 may determine any time differential between its sensor readings and the IMU synchronization signal. Details of the sensor data synchronization are schematically shown in the timing diagram of FIG. 10. The top trace indicates the radio synchronization signal received by auxiliary communication device 38, but any synchronization between base station 12 and tracked object 14 may be employed. Next, the ultrasound channel representing the ultrasonic trigger signal is shown to be coordinated by the predefined delay. The ultrasonic trigger signal is used as the IMU synchronization signal and input to IMU 56. IMU 56 detects the input of the IMU synchronization signal and may generate an internal synchronization pulse, indicated as the sync channel in FIG. 10. The signal on the synchronization channel can therefore be aligned with the ultrasound pulse and the IMU sensor data. Correspondingly, IMU 56 after receiving the IMU synchronization signal from auxiliary communication device 38 may determine a timing delay T between the IMU sensor data samples, also indicated as up arrows, and the synchronization signal. Timing delay T is determined by starting a counter when a rising edge is detected on the dedicated synchronization input pin, and the counter is stopped at the first IMU sensor data after the synchronization signal. The sensor data of IMU 56 is timestamped based on its internal clock as is indicated in the bottom trace of FIG. 10. By combining the timing delay T with the timestamp of the first received sensor data, the timestamp of the synchronization signal based on internal clock of IMU 56 may be determined. Based on the timestamped sensor data from 56, and the timestamped synchronization signal or timing delay T, the IMU sensor data may be synchronized with the ultrasound data. For example, because IMU synchronization signal can be determined using the timestamped IMU sensor data based on the internal IMU clock and the IMU synchronization signal can be determined based on the clock of the tracked object 14, the IMU sensor data and ultrasonic pulse 18 can be synchronized. The synchronization may be performed at tracked object 14, or all timing data and sensor data may be transferred from tracked object 14 to base station 12, for example using auxiliary communications devices 28 and 38, so that the synchronization is performed at base station 12. This transmission may be performed using e.g. BLUETOOTH protocols, or any other radio or wireless protocol. The data communicated to base station 12 comprises the sensor data and the associated timestamp data, and, when a synchronization signal is detected, also comprises a timestamp for the received synchronization signal, or the timing delay T with respect to the received synchronization signal. Fusion of information based on the inertial measurements and the ultrasonic measurement is then performed using the received data and timestamps. In the embodiment shown in FIG. 10, a subsequent synchronization signal is sent to IMU 56 so that a new timing delay T may be determined and applied in combination with the following sensor data timestamps.

Figure 11:
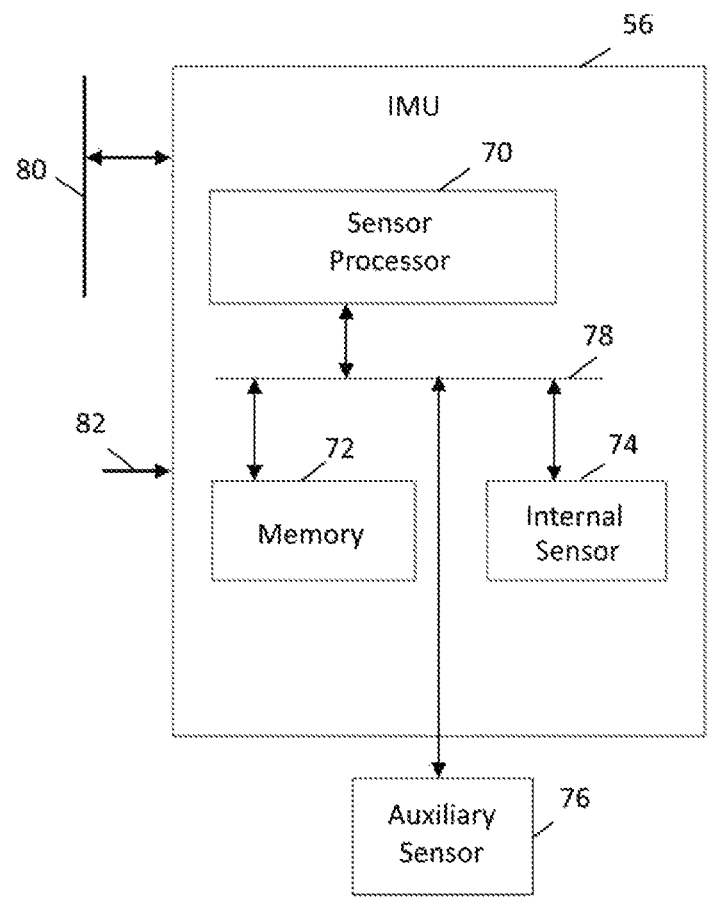
FIG. 11 is a schematic block diagram of an IMU having a dedicated IMU synchronization signal input in accordance with the present invention.

Further details of one embodiment of IMU 56 are schematically represented in FIG. 11. As shown, IMU 56, which may be an integrated sensor processing unit (SPU) in some embodiments, features sensor processor 70, memory 72 and internal sensor 74. Memory 70 may store algorithms, routines or other instructions for processing data output by internal sensor 74 and/or other sensors as described below using logic or controllers of sensor processor 70, as well as storing raw data and/or motion data output by internal sensor 74 or other sensors. Memory 72 may also be used for any of the functions associated with other memory resources of base station 12 or tracked object 14. Internal sensor 74 may be one or more sensors for measuring motion of device 100 in space, such as an accelerometer, a gyroscope, a magnetometer, a pressure sensor or others and generally includes at least one inertial sensor. Depending on the configuration, IMU 56 measures one or more axes of rotation and/or one or more axes of acceleration of the device. In one embodiment, internal sensor 74 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 70, or any other suitable processing resources, combines data from internal sensor 74 to provide a six axis determination of motion or six degrees of freedom (6DOF). As desired, internal sensor 74 may be implemented using Micro Electro Mechanical System (MEMS) to be integrated with IMU 56 in a single package. Exemplary details regarding suitable configurations of IMU 56 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. Suitable implementations for IMU 56 in base station 12 and/or tracked object 14 are available from InvenSense, Inc. of San Jose, Calif.

Alternatively or in addition, IMU 56 may receive data from an auxiliary sensor 76 configured to measure one or more aspects about the environment surrounding IMU 56. This is optional and not required in all embodiments. For example, a pressure sensor and/or a magnetometer may be used to refine motion determinations made using internal sensor 74. In one embodiment, auxiliary sensor 76 may include a magnetometer measuring along three orthogonal axes and output data to be fused with the gyroscope and accelerometer inertial sensor data to provide a nine axis determination of motion. In another embodiment, auxiliary sensor 76 may also include a pressure sensor to provide an altitude determination that may be fused with the other sensor data to provide a ten axis determination of motion. Although described in the context of one or more sensors being MEMS based, the techniques of this disclosure may be applied to any sensor design or implementation. In the embodiment shown, sensor processor 70, memory 72, internal sensor 74 and/or auxiliary sensor 76 may be coupled though bus 78. Likewise, IMU may be coupled to other components of base station 12 or tracked object 14 through bus 80, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components, such as by using a dedicated bus between processors and memories. As an illustration, IMU 56 may receive information over bus 80 from an external sensor. This is optional and not required in all embodiments. An external sensor may be one or more sensors as described above, such as an accelerometer and/or a gyroscope. As used herein, "external" means a sensor that is not integrated with IMU 56 and may be remote or local. In some embodiments, IMU 56 may have a dedicated input 82, such as a pin of the integrated package, for the purpose of receiving the IMU synchronization signal discussed above.

An example of the invention may include one or more of the following steps, functions, or structures:

moving at least one tracked object with respect to a base station;

transmitting one or more ultrasonic pulses from one of the base station and the at least one tracked object to the other of the base station and the at least one tracked object;

using at least one of time-difference-of-arrival measurements and time-of-flight measurements of the one or more ultrasonic pulses to estimate at least one of the relative location and relative orientation of the at least one tracked object with respect to the base station; and The example of the invention may also include one or more steps, functions, or structures set forth above combined with displaying visual content on a screen.

The example of the invention may also include one or more steps, functions, or structures set forth above combined with at least a portion of the visual content being virtual.

The example of the invention may also include one or more steps, functions, or structures set forth above combined with maintaining, during the displaying, the base station stationary with respect to the screen.

The example of the invention may also include one or more steps, functions, or structures set forth above combined with the base station comprising at least three ultrasonic transducers.

The example of the invention may also include one or more steps, functions, or structures set forth above combined with the at least one tracked object comprising at least one ultrasonic transducer.

The example of the invention may also include one or more steps, functions, or structures set forth above combined with tracking relative motion in three dimensional space between the base station and the at least one tracked object.

The example of the invention may also include one or more steps, functions, or structures set forth above combined with the tracking comprising performing, by each of the at least three ultrasonic transducers, one of transmitting and receiving one or more ultrasonic pulses.

The example of the invention may also include one or more steps, functions, or structures set forth above combined with the tracking further comprising performing, by the at least one ultrasonic transducer, the other of transmitting and receiving the one or more ultrasonic pulses.

The example of the invention may also include one or more steps, functions, or structures set forth above combined with the tracking further comprising using at least one of time-difference-of-arrival and time-of-flight of the one or more ultrasonic pulses to estimate a location of the at least one object with respect to the base station in three dimensional space.

The example of the invention may also include one or more steps, functions, or structures set forth above combined with altering, based on the tracking, the at least a portion of the visual content.

The example of the invention may also include one or more steps, functions, or structures set forth above combined with altering, based on the tracking, the at least a portion of the visual content that is virtual.

The example of the invention may also include one or more steps, functions, or structures set forth above combined with each pulse of the one or more ultrasonic pulses being encoded with information identifying which transducer transmitted it.

The example of the invention may also include one or more steps, functions, or structures set forth above combined with the information being encoded using DPSK.

The example of the invention may also include one or more steps, functions, or structures set forth above combined with the information being encoded using QPSK.

The example of the invention may also include one or more steps, functions, or structures set forth above combined with the tracking further comprising transmitting, by a first transducer of the at least three ultrasonic transducers, a first pulse of the one or more ultrasonic pulses.

The example of the invention may also include one or more steps, functions, or structures set forth above combined with the tracking further comprising transmitting, by a second transducer of the at least three ultrasonic transducers, a second pulse of the one or more ultrasonic pulses.

The example of the invention may also include one or more steps, functions, or structures set forth above combined with the tracking further comprising transmitting, by a third transducer of the at least three ultrasonic transducers, a third pulse of the one or more ultrasonic pulses.

The example of the invention may also include one or more steps, functions, or structures set forth above combined with the transmitting the first pulse occurring before the transmitting of the second pulse.

The example of the invention may also include one or more steps, functions, or structures set forth above combined with a time delay between the transmitting of the first pulse and the transmitting of the second pulse being greater than a pulse duration of the first pulse plus a distance between the first and second transducers divided by a speed of sound in an environment surrounding the base station.

The example of the invention may also include one or more steps, functions, or structures set forth above combined with the transmitting of the second pulse occurring before the transmitting of the third pulse.

The example of the invention may also include one or more steps, functions, or structures set forth above combined with a time delay between the transmitting of the second pulse and the transmitting of the third pulse being greater than a pulse duration of the second pulse plus a distance between the second and third transducers divided by the speed of sound.

The example of the invention may also include one or more steps, functions, or structures set forth above combined with the tracking further comprising receiving, by the at least one ultrasonic transducer, the first, second, and third ultrasonic pulses.

The example of the invention may also include one or more steps, functions, or structures set forth above combined with the tracking further comprising using, by the at least one tracked object, time-difference-of-arrival of the first, second, and third ultrasonic pulses to estimate the relative orientation.

The example of the invention may also include one or more steps, functions, or structures set forth above combined with communicating, by the at least one object, to the base station the at least one of the relation location and the relative orientation.

The example of the invention may also include one or more steps, functions, or structures set forth above combined with the communicating comprising communicating the at least one of the relation location and the relative orientation via encoded radio waves.

The example of the invention may also include one or more steps, functions, or structures set forth above combined with the screen and the base station forming part of a single head-mounted display moving with respect to the earth while being worn by a human.

The example of the invention may also include one or more steps, functions, or structures set forth above combined with the screen being stationary with respect to the earth during the displaying.

The example of the invention may also include one or more steps, functions, or structures set forth above combined with the base station and the at least one object each comprising at least one inertial measurement unit.

The example of the invention may also include one or more steps, functions, or structures set forth above combined with applying a sensor-fusion algorithm to fuse inertial data output by one or more inertial measurement units of the base station and the at least one object with location data derived from the tracking.

The example of the invention may also include one or more steps, functions, or structures set forth above combined with using location data derived from the tracking to correct drift error associated with one or more of the inertial measurement units of the base station and the at least one object.

The example of the invention may also include one or more steps, functions, or structures set forth above combined with one or more of the following steps, functions, or structures:

transmitting, by the base station, a radio pulse;

using, by the at least one tracked object, the radio pulse to synchronize the at least one tracked object with the base station;

the radio pulse being transmitted immediately before sending the first ultrasonic pulse;

the at least one tracked object further comprising an inertial measurement unit;

the inertial measurement unit comprising a three axis accelerometer and a three axis gyroscope;

the tracking further comprising performing sensor fusion on time-of-flight measurements of the first, second, and third ultrasonic pulses and data output by the inertial measurement unit to estimate values for six-degrees of freedom of the at least one tracked object with respect to the base station;

the sensor fusion being performed by one or more processors forming part of the at least one tracked object;

the time-of-flight of the first, second, and third ultrasonic pulses and the data output by the inertial measurement unit being sent by the at least one tracked object to the base station;

the sensor fusion being performed by one or more processors forming part of the base station;

the at least one ultrasonic transducer comprising two different ultrasonic transducers;

the first, second, and third ultrasonic transducers being located with respect to one another so as to be non-collinear;

the time-of-flight of the first, second, and third ultrasonic pulses comprising the time-of-flight of the first, second, and third ultrasonic pulses to each of the two different ultrasonic transducers;

the sensor fusion comprising (1) using a gravity vector to estimate first and second orientation angles of the at least one tracked object and (2) using relative range measurements between the first, second, and third ultrasonic transducers and the two different ultrasonic transducers to estimate a third orientation angle of the at least one tracked object;

the at least one ultrasonic transducer comprising at least three transducers;

the tracking further comprising calculating relative range measurements between the first, second, and third ultrasonic transducers of the base-station and at least three transducers of the at least one tracked object;

the tracking further comprising calculating a measure of quality for each of the time-of-flight measurements of the first, second, and third ultrasonic pulses;

the performing sensor fusion comprising applying a sensor fusion algorithm;

the performing the sensor fusion further comprising using the measure of quality for each of the time-of-flight measurements to improve the accuracy of the sensor fusion algorithm;

the measure of quality for each of the time-of-flight measurements comprising a signal-to-noise ratio of a corresponding ultrasonic pulse of the first, second, and third ultrasonic pulses;

the measure of quality for each of the time-of-flight measurements comprising a slope of a rising edge of a corresponding ultrasonic pulse of the first, second, and third ultrasonic pulses;

the performing sensor fusion comprising applying a sensor fusion algorithm;

the data output by the inertial measurement unit being provided to the sensor fusion algorithm at a faster sample rate than the time-of-flight measurements of the first, second, and third ultrasonic pulses;

the moving comprising moving, by a human using exclusively human power, the at least one tracked object with respect to the base station;

the at least one tracked object being a game controller;

the at least one tracked object being a ring worn by the human;

the at least one tracked object being a wrist band worn by the human;

the base station being a head-mounted display worn by the human and the at least one tracked object comprises at least one hand-held controller held by the human;

the head-mounted display comprising a first inertial measurement unit;

the at least one tracked object comprising a second inertial measurement unit;

the tracking further comprising using, by one or more processors forming part of the base station, measurements from the first inertial measurement unit, measurements from the second measurement unit, and time-of-flight measurements of the first, second, and third ultrasonic pulses to estimate values for six degrees of freedom of the at least one tracked object with respect to the base station;

altering, based on the tracking, at least a portion of a visual content that is displayed by the head-mounted display;

the base station comprising fourth, fifth, and sixth ultrasonic transducers;

a field of view of the first, second, and third ultrasonic transducer being substantially non-overlapping with a field of view of the fourth, fifth, and sixth ultrasonic transducers;

the fourth, fifth, and sixth ultrasonic transducers transmitting fourth, fifth, and sixth ultrasonic pulses, respectively;

the fourth, fifth, and sixth ultrasonic pulses being transmitted within a period of time that overlaps with the transmitting of the first, second, and third ultrasonic pulses;

the first, second, and third ultrasonic pulses forming a first group and being each encoded with an identifier unique the first group;

the fourth, fifth, and sixth ultrasonic pulses forming a second group and being each encoded with an identifier unique the second group;

each of the first, second, and third ultrasonic pulses being encoded with information identifying which transducer transmitted it;

the information being encoded using DPSK or using QPSK;

using a triggering signal sent by the base station to synchronize a clock of the at least one tracked object with a clock of the base station;

receiving, by the at least one tracked object, the triggering signal;

triggering, by the at least one tracked object in response to the receiving the triggering signal, the at least one ultrasonic transducer to commence a receiving phase;

receiving, by the at least one tracked object, the triggering signal;

updating, by the at least one tracked object in response to the receiving the triggering signal, the clock of the at least one tracked object;

triggering, by the at least one tracked object in response to the receiving the triggering signal, the at least one ultrasonic transducer to commence a receiving phase on a time of the clock of the at least one tracked object;

the triggering signal being a radio synchronization packet;

the triggering signal being sent within a first time slot that is known in advance by the at least one tracked object;

the first time slot being set up by a radio communication from the base station to the at least one tracked object;

time-of-flight measurements of the first, second, and third ultrasonic pulses being sent from the at least one tracked object to the base station via a radio information packet;

the radio information packet being sent within a second time slot that is different from the first time slot;

the first and second time slots being set up by a radio communication from the base station to the at least one tracked object;

the second and third ultrasonic transducers receiving the first pulse;

the first and third ultrasonic transducers receiving the second pulse;

the first and second ultrasonic transducers receiving the third pulse; and tracking further comprising using time-of-flight measurements between at least two of the first, second, and third ultrasonic transducers and known relative locations between the at least two of the first, second, and third ultrasonic transducers to detect and compensate for variations in the speed of sound caused by environmental changes.

Another example of the invention may include one or more of the following steps, functions, or structures:

a base station;

at least one tracked object moving with respect to the base station;

one or more processors;

memory operably connected to the one or more processors; and the memory storing software programmed to use at least one of time-difference-of-arrival and time-of-flight of one or more ultrasonic pulses transmitted from one of the base station and the at least one tracked object to the other of the base station and the at least one tracked object to estimate at least one of the relation location and the relative orientation of the at least one tracked object with respect to the base station.

The example of the invention may also include one or more steps, functions, or structures set forth above combined with a screen displaying visual content.

The example of the invention may also include one or more steps, functions, or structures set forth above combined with at least a portion of the visual content being virtual.

The example of the invention may also include one or more steps, functions, or structures set forth above combined with the base station being stationary with respect to the screen.

The example of the invention may also include one or more steps, functions, or structures set forth above combined with the base station comprising at least three ultrasonic transducers.

The example of the invention may also include one or more steps, functions, or structures set forth above combined with the at least one object comprising at least one ultrasonic transducer.

The example of the invention may also include one or more steps, functions, or structures set forth above combined with the base station wherein each of the at least three ultrasonic transducers performs one of transmitting and receiving one or more ultrasonic pulses.

The example of the invention may also include one or more steps, functions, or structures set forth above combined with the at least one object wherein the at least one ultrasonic transducer performs the other of transmitting and receiving the one or more ultrasonic pulses.

The example of the invention may also include one or more steps, functions, or structures set forth above combined with at least one of the one or more processors forming part of the base station.

The example of the invention may also include one or more steps, functions, or structures set forth above combined with at least one of the one or more processors forming part of the at least one tracked object.

The example of the invention may also include one or more steps, functions, or structures set forth above combined with the memory storing software further programmed to alter, based on the relative location and/or the relative orientation, at least a portion of the visual content.

The example of the invention may also include one or more steps, functions, or structures set forth above combined with the memory storing software further programmed to alter, based on the relative location and/or the relative orientation, the at least a portion of the visual content that is virtual.

The example of the invention may also include one or more steps, functions, or structures set forth above combined with the screen and the base station forming part of a head-mounted display moving with respect to the earth while being worn by a human.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure.

References in the specification to "one embodiment," "an embodiment," "an example embodiment," "selected embodiments," "certain embodiments," and the like, indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a sensor tracking module also referred to as Sensor Processing Unit (SPU) that includes at least one sensor in addition to electronic circuits. The sensor, such as a gyroscope, a magnetometer, an accelerometer, a microphone, a pressure sensor, a proximity sensor, or an ambient light sensor, among others known in the art, are contemplated. Some embodiments include accelerometer and gyroscope, which each provide a measurement along three axes that are orthogonal to each other. Such a device is often referred to as a 6-axis device. Other embodiments include accelerometer, gyroscope, and magnetometer, which each provide a measurement along three axes that are orthogonal to each other. Such a device is often referred to as a 9-axis device. Other embodiments may not include all the sensors or may provide measurements along one or more axes. The sensors may be formed on a first substrate. Other embodiments may include solid-state sensors or any other type of sensors. The electronic circuits in the SPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data may refer to processed and/or raw data. Processing may include applying a sensor fusion algorithm or applying any other algorithm. In the case of a sensor fusion algorithm, data from a plurality of sensors may be combined to provide, for example, an orientation of the device. In the described embodiments, a SPU may include processors, memory, control logic and sensors among structures.

A frame of reference for a portable device such as transmitter 102 may be the body frame, having three orthogonal axes. Switching from the body frame to the world frame or any other suitable reference frame (such as e.g. a reference frame associated with one or more of the receiver 104s), or vice versa, may be performed by apply the appropriate rotation to the data. Similarly, the world frame may have axes fixed to the Earth, such as by aligning the Z axis of the world frame with the gravity vector resulting from Earth's gravity field, pointing from the surface of the Earth to the sky. Although the math and descriptions provided in this disclosure are in the context of these frames, one of skill in the art will realize that similar operations may be performed using other definitions and frames of reference. All the teachings could be redone with different definitions. Thus, the orientation of a portable device may be expressed as the rotational operation that translates the body frame to the world frame, such as a rotation operation that aligns the Z axis of the body frame with the gravity vector. In some embodiments, the rotation operation may be expressed in the form of a unit quaternion. As used herein, the terms "quaternion" and "unit quaternion" may be used interchangeably for convenience. Accordingly, a quaternion may be a four element vector describing the transition from one rotational orientation to another rotational orientation and may be used to represent the orientation of a portable device. A unit quaternion has a scalar term and 3 imaginary terms. In this disclosure, the quaternion is expressed with the scalar term first followed by the imaginary terms but, appropriate modifications may be made to the formulas, equations and operations to accommodate different definitions of quaternion.

Although the present invention has been described in accordance with the embodiments shown, one of ordinary skill in the art will readily recognize that there may be variations to the embodiments and those variations would be within the spirit and scope of the present invention. For example, the techniques of this disclosure have been explained in the context of a HMD and a controller, but the techniques may be applied in any other suitable context. One skilled in the art may readily devise other systems consistent with the disclosed embodiments which are intended to be within the scope of this disclosure.

What is claimed is:

1. A method comprising:
   moving at least one tracked object with respect to a base station, the at least one tracked object comprising at least one ultrasonic transducer and at least one inertial sensor assembly comprising a three axis accelerometer and a three axis gyroscope, the base station comprising first, second, and third ultrasonic transducers; and
   tracking, during the moving, relative distance in three dimensional space between the base station and the at least one tracked object, the tracking comprising
      transmitting, by the first ultrasonic transducer, a first ultrasonic pulse,
      transmitting, by the second ultrasonic transducer, a second ultrasonic pulse, wherein a time delay between the first ultrasonic pulse and the second ultrasonic pulse is greater than a pulse duration of the first ultrasonic pulse plus a distance between the first and second ultrasonic transducers divided by a speed of sound in an environment surrounding the base station,
      transmitting, by the third ultrasonic transducer, a third ultrasonic pulse, wherein a time delay between the second ultrasonic pulse and the third ultrasonic pulse is greater than a pulse duration of the second ultrasonic pulse plus a distance between the second and third ultrasonic transducers divided by the speed of sound,
      receiving, by the at least one ultrasonic transducer, the first, second, and third ultrasonic pulses, using at least one of time-difference-of-arrival and time-of-flight of the first, second, and third ultrasonic pulses to estimate at least one of a relative location and a relative orientation of the at least one tracked object with respect to the base station in three dimensional space, transmitting, by the base station, a synchronization signal coordinated with at least one of the first ultrasonic pulse, the second ultrasonic pulse, and the third ultrasonic pulse, receiving, by the at least one tracked object, the synchronization signal receiving, by the at least one tracked object, the synchronization signal, and fusing the estimate with information derived from the inertial sensor assembly based at least in part on the synchronization signal.

2. The method of claim 1, wherein the synchronization signal is received by the inertial sensor assembly.

3. The method of claim 1, further comprising generating an IMU synchronization signal upon receiving the synchronization signal by the at least one tracked object and providing the IMU synchronization signal to the inertial sensor assembly.

4. The method of claim 3, wherein the inertial sensor assembly determines a time difference between the received IMU synchronization signal and at least one sensor data sample.

5. The method of claim 4, wherein the inertial sensor assembly is configured to output the sensor data and the determined time difference.

6. The method of claim 3, wherein the inertial sensor assembly determines a timestamp of the received IMU synchronization signal based on an internal inertial sensor assembly clock.

7. The method of claim 6, wherein the inertial sensor assembly is configured to output timestamped sensor data, wherein the timestamp is based on an internal clock, further comprising coordinating the timestamped sensor data with the IMU synchronization signal timestamp.

8. The method of claim 3, wherein the IMU synchronization signal is generated a predetermined delay after receiving the synchronization signal.

9. The method of claim 3, wherein the IMU synchronization signal is generated a predetermined delay after receiving the synchronization signal.

10. The method of claim 1, wherein the fusing comprises a comparison of a timing of the synchronization signal based on a clock of the at least one tracked object and a timing of the synchronization signal based on a clock of the inertial sensor assembly.

11. The method of claim 1, further comprising generating an ultrasonic trigger signal to start an ultrasonic receive phase of the at least one ultrasonic transducer upon receiving the synchronization signal by the at least one tracked object.

12. The method of claim 11, further comprising providing the ultrasonic trigger signal to the inertial sensor assembly.

13. The method of claim 1, wherein the synchronization signal comprises a radio pulse.

14. The method of claim 1, wherein the synchronization signal comprises an ultrasonic pulse.

15. A system comprising:
a base station comprising first, second, and third ultrasonic transducers;
at least one tracked object that is movable with respect to the base station, the at least one tracked object comprising at least one ultrasonic transducer and an inertial sensor assembly having a three axis accelerometer and a three axis gyroscope; and
at least one processing device programmed to:
invoke transmitting, by the first ultrasonic transducer, a first ultrasonic pulse;
invoke transmitting, by the second ultrasonic transducer, a second ultrasonic pulse, wherein a time delay between the first ultrasonic pulse and the second ultrasonic pulse is greater than a pulse duration of the first ultrasonic pulse plus a distance between the first and second ultrasonic transducers divided by a speed of sound in an environment surrounding the base station;
invoke transmitting, by the third ultrasonic transducer, a third ultrasonic pulse, wherein a time delay between the second ultrasonic pulse and the third ultrasonic pulse is greater than a pulse duration of the second ultrasonic pulse plus a distance between the second and third ultrasonic transducers divided by the speed of sound;
detect receiving, by the at least one ultrasonic transducer, the first, second, and third ultrasonic pulses;
use at least one of time-difference-of-arrival and time-of-flight of the first, second, and third ultrasonic pulses to estimate at least one of a relative location and a relative orientation of the at least one tracked object with respect to the base station in three dimensional space; and
fuse the estimate with information derived from the inertial sensor assembly based at least in part on a synchronization signal transmitted by the base station and received by the at least one tracked object that is coordinated with at least one of the first ultrasonic pulse, the second ultrasonic pulse, and the third ultrasonic pulse.

16. The system of claim 15, wherein the at least one tracked object is configured to receive the synchronization signal with the inertial sensor assembly.

17. The system of claim 15, wherein the at least one tracked object is configured to generate an IMU synchronization signal upon receiving the synchronization signal and provide the IMU synchronization signal to the inertial sensor assembly.

18. The system of claim 15, wherein the at least one processing device is programmed to fuse the estimate with information derived from the inertial sensor assembly by comparing a timing of the synchronization signal based on a clock of the at least one tracked object and a timing of the synchronization signal based on a clock of the inertial sensor assembly.

19. The system of claim 15, wherein the at least one tracked object is configured to generate an ultrasonic trigger signal to start an ultrasonic receive phase of the at least one ultrasonic transducer upon receiving the synchronization signal by the at least one tracked object and provide the ultrasonic trigger signal to the inertial sensor assembly.

20. The system of claim 15, wherein the fusion is performed by one or more processors forming part of the at least one tracked object.

21. The system of claim 15, wherein: the time-of-flight of the first, second, and third ultrasonic pulses and the data output by the inertial sensor assembly are sent by the at least one tracked object to the base station; and the fusion is performed by one or more processors forming part of the base station.

22. A portable transceiver comprising:
at least one ultrasonic transceiver and at least one inertial sensor assembly, wherein the portable transceiver is movable with respect to a base station comprising at least three ultrasonic transceivers, each of the at least three ultrasonic transceivers configured to perform one of transmitting and receiving one or more ultrasonic pulses, and wherein the at least one ultrasonic transceiver of the portable transceiver is configured to perform the other of transmitting and receiving the one or more ultrasonic pulses;
one or more processors; and
memory operably connected to the one or more processors, the memory storing software programmed to use at least one of time-difference-of-arrival and time-of-flight of the one or more ultrasonic pulses to estimate a location of the at least one object with respect to the base station in three dimensional space and fuse the estimate with information derived from the inertial sensor assembly based at least in part on a received synchronization signal coordinated with at least one of the ultrasonic transceivers and transmitted by the base station.

23. The portable transceiver of claim 21, wherein the portable transceiver is configured to generate an IMU synchronization signal upon receiving the synchronization signal and provide the IMU synchronization signal to the inertial sensor assembly and wherein the inertial sensor assembly is configured to determine a time difference between the IMU synchronization signal and at least one sensor data sample based on an internal sensor assembly clock.

\* \* \* \* \*